(12) United States Patent
Wysocki

(10) Patent No.: US 8,515,450 B2
(45) Date of Patent: Aug. 20, 2013

(54) METHOD OF CREATING AN AUDIENCE MAP

(76) Inventor: Arkadiusz Wysocki, Lodz (PL)

( * ) Notice: Subject to any disclaimer, the term of this patent is extended or adjusted under 35 U.S.C. 154(b) by 0 days.

(21) Appl. No.: 13/392,537

(22) PCT Filed: Dec. 31, 2009

(86) PCT No.: PCT/EP2009/068049
§ 371 (c)(1),
(2), (4) Date: Feb. 27, 2012

(87) PCT Pub. No.: WO2011/023241
PCT Pub. Date: Mar. 3, 2011

(65) Prior Publication Data
US 2012/0157118 A1   Jun. 21, 2012

Related U.S. Application Data

(60) Provisional application No. 61/272,164, filed on Aug. 25, 2009.

(51) Int. Cl.
*H04W 24/00* (2009.01)

(52) U.S. Cl.
USPC .......................... 455/456.1; 725/12

(58) Field of Classification Search
USPC ............... 455/456.1; 342/357.07; 725/12
See application file for complete search history.

(56) References Cited

U.S. PATENT DOCUMENTS

| | | | |
|---|---|---|---|
| 7,123,918 B1 | 10/2006 | Goodman | |
| 7,187,377 B1 | 3/2007 | Pella et al. | |
| 2003/0122708 A1 | 7/2003 | Percy et al. | |
| 2009/0158309 A1 | 6/2009 | Moon et al. | |

FOREIGN PATENT DOCUMENTS

| | | |
|---|---|---|
| EP | 1422643 A1 | 5/2004 |
| WO | 2008001472 A1 | 1/2008 |

OTHER PUBLICATIONS

International Search report issued Sep. 9, 2010 for International Application No. PCT/EP2009/068049.

*Primary Examiner* — Charles Shedrick

(57) ABSTRACT

A method of creating an audience map comprising the steps of; receiving a focus point comprising location data defining a geographical location; receiving trace data defining at least one geographical location of a potential viewer; determining a field of view which represents a region within which a potential viewer could see the focus point; projecting the field of view from either; (i) the focus point and determining whether the or each geographical location of the trace data falls within the field of view of the focus point and recording occurrences thereof; or (ii) the or each of the geographical locations of the potential viewer and determining whether the geographical location of the focus point falls within the field of view of the or each of the geographical locations of the potential viewer and recording occurrences thereof; and generating an audience map based on the recorded occurrences.

11 Claims, 3 Drawing Sheets

METHOD OF CREATING AN AUDIENCE MAP

This application is the National Stage of International Application No. PCT/EP2009/068049, filed Dec. 31, 2009 and designating the United States. The entire content of this application is incorporated herein by reference. This application claims priority from U.S. provisional application No. 61/272,164, filed 25 Aug. 2009. The entire content of this application is also incorporated herein by reference.

TECHNICAL FIELD

This invention relates to a method of creating an audience map and, in particular, a method of creating an audience map of potential viewers of an advertisement. It also relates to a system for performing the method.

BACKGROUND OF THE INVENTION

The location of advertisements is of prime importance to advertising agencies. Likewise the location of shops is of prime importance to retailers. The location of an advertisement hoardings can effect there value and the price that companies are willing to pay for their advertisements to be placed on that hoarding. For example, a hoarding that is located in a busy city centre square will have more value than one located on a quiet street or one that is partially obscured by other buildings. It is also important to retailers that their shop fronts have the potential to be noticed to entice in shoppers.

Prior art methods to determine the number of potential viewers comprise manually performing street surveys to count the number of passing vehicles or pedestrians.

EP 1 376 058 provides a method of collecting market research information of mobile consumers moving through a geographical region. The method uses the data collected from mobile computing platforms such as GPS units or other navigation systems to identify which of the platforms are located within or passing through an advertising zone. This method is not particularly accurate as it only determines if a person is located within an advertising zone whether there was a chance of them seeing the advertising or not.

SUMMARY OF THE INVENTION

According to a first aspect of the invention, we provide a method of creating an audience map comprising the steps of;
receiving a focus point comprising location data defining a geographical location;
receiving trace data defining at least one geographical location of a potential viewer;
determining a field of view which represents a region within which a potential viewer could see the focus point;
projecting the field of view from either;
(i) the focus point and determining whether the or each geographical location of the trace data falls within the field of view of the focus point and recording occurrences thereof; or
(ii) the or each of the geographical locations of the potential viewer and determining whether the geographical location of the focus point falls within the field of view of the or each of the geographical locations of the potential viewer and recording occurrences thereof; and
generating an audience map based on the recorded occurrences.

This is advantageous as the step of projecting a field of view improves the accuracy of collecting audience data by defining a region in which the potential viewer could view the focus point, which is an advertising hoarding for example. The region defined by the field of view can be selected to be a region in which the hoarding is clearly visible to the potential viewer.

Preferably, the trace data includes the direction the potential viewer is travelling at the geographical location and the step (i) comprises determining whether the or each geographical location of the trace data falls within the field of view of the focus point and recording occurrences thereof along with a probability of view value based on the direction of travel with respect to the focus point at the geographical location. This is advantageous as the direction that a potential viewer is travelling affects the probability of them seeing the focus point. If they are travelling away from the focus point the chances of them seeing it are less than if they were travelling towards it.

The focus point may comprise an area and the field of view may be projected from the area. Therefore the focus point will more accurately represent a billboard or shop front and therefore its visibility to potential viewers.

Preferably, the trace data comprises a plurality of location points comprising the geographical location and direction of travel captured at predetermined time intervals.

Preferably the trace data is received from navigation devices of potential viewers, the navigation devices adapted to log at least the location and direction of the potential viewer at predetermined time intervals. Thus, in-car satellite navigation devices or hand-held satellite navigation devices, also known as Satnavs, could be used. This data can be easily collected by navigation systems that log a user's movements. The data can be uploaded to a server and stored to be used to create an audience map.

Preferably, the field of view of the potential viewer comprises an area which represents the potential viewer's field of vision and is calculated using the direction of travel of the potential viewer at each geographical location.

Preferably, the field of view comprises a volume and the trace data comprises three-dimensional geographical location information.

Preferably the method includes the step of receiving obstruction data, which represents regions in which the field of view cannot extend and modifying the field of view so that regions within and beyond the obstructions are excluded therefrom. This is advantageous as the obstruction data can be used to modify the size and/or shape of the field of view projection to take account of buildings or other obstructions that would prevent a potential viewer seeing the focus point despite falling within the field of view if the obstruction was not there.

Preferably the trace data includes a record of the velocity of the potential viewer at each of the geographical locations.

Preferably the field of view of the potential viewer at each geographical location of the trace data is determined from predetermined values and the velocity of the potential viewer at the geographical location. This is advantageous as the field of view can be made larger when the velocity is low or zero, as the potential view is more likely to be looking around rather than in the direction they are travelling. Further, as the velocity increases, the field of view can be narrowed as the potential viewer will be concentrating on driving, for example.

Preferably the method includes the step of selecting a different geographical location for the focus point and repeating the method. This is advantageous because as more focus points are considered, the audience map can be expanded to cover facades of building or entire cities to identify prime locations for advertising or provide statistical information by way of the audience map.

According to a second aspect of the invention, we provide a computer system adapted to perform the method of the first aspect of the invention.

According to a third aspect of the invention, we provide a data carrier comprising information representative of the method of the first aspect of the invention.

BRIEF DESCRIPTION OF THE DRAWINGS

There now follows by way of example only a detailed description of the present invention with reference to the accompanying drawings in which.

The present embodiment comprises the creation of an audience map using geographical location data collected from actual journeys traveled by people. The data is collected using navigation equipment such as Satnavs, which log the geographical location of a user (known later as a "potential viewer") at predetermined time intervals. Thus, the data comprises a plurality of geographical location points. The data collected by the navigation equipment may include the time that the location data was collected at each point, the velocity of the user at each point and the direction they are travelling at each point. It will be appreciated that the direction of travel may be determined from the velocity information. Navigation equipment that logs this information and then uploads it to a central server will be known to those skilled in the art that navigation equipment.

Figure 1:
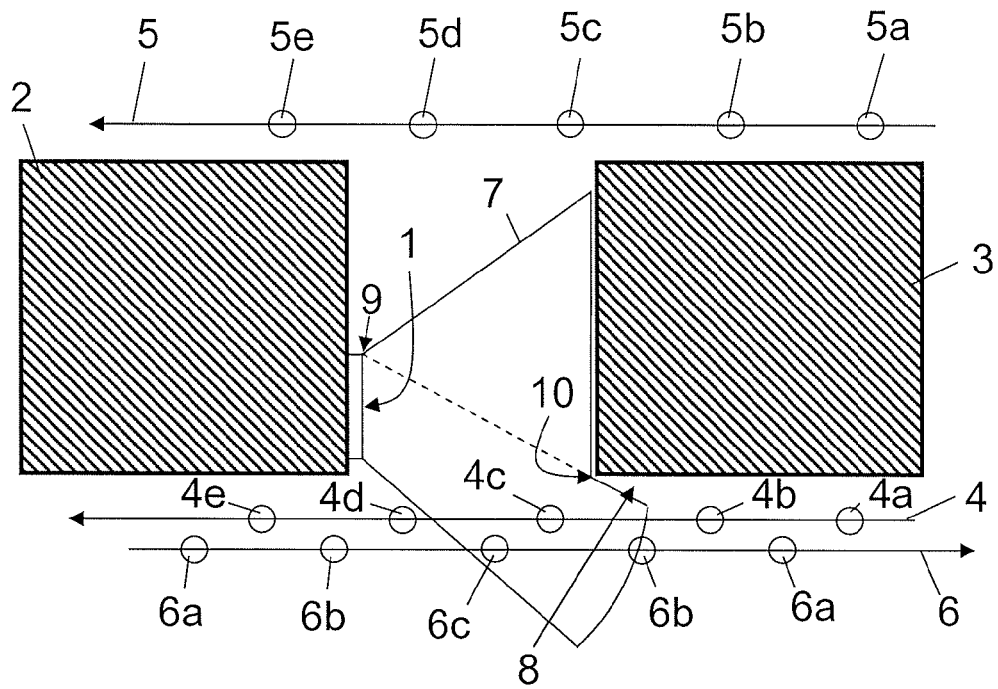
FIG. 1 shows a plan view representation of a field of view projected from a focus point.

The embodiments described below explain the operation of the method and the advantageous use of a "field of view", which comprises a region in which a potential viewer could see a particular location, which could be the location of an advertisement or the possible site for an advertisement. The field of view can be projected from either a single point, a line (if working in 2 dimensions) or area (if working in 3 dimensions) associated with the advertisement or part of a façade. The term "focus point" is used herein to refer to any of these possibilities. Alternatively, the field of view could be projected from the potential viewers. FIG. 1 shows an example of the situation in which the field of view is projected from a focus point.

FIG. 1 shows a plan view of part of a city and shows a focus point 1, comprising a billboard mounted to the side of a first building 2. There is a second building 3 opposite the first building 2. Three sets of trace data are represented by the circles connected by the arrows 4, 5, 6. Each of the circles represent the geographical location of the potential viewer at a particular time. Thus, the set of points 4 show a potential viewer that traveled from right to left as shown in the Figure. The set of points 5 represent a potential viewer that traveled from right to left on the opposite side of the buildings 2 and 3. The set of points 6 represent a potential viewer that traveled from left to right. It will be appreciated that this trace data may not have been acquired at the same time. It may be a composite of trace data collected over a period of a week or month.

A field of view has been projected from the focus point 1 to define a field of view region 7. The field of view region 7 may be defined by the maximum distance at which an average person can read the advertisement and the maximum angle from the normal at which an average person can read the advertisement. The field of view region 7 therefore substantially comprises a circular sector extending from the focus point. Alternatively, the field of view region may be calculated in three dimensions and as such may be cone shaped. It will be appreciated that the circular sector may be approximated to a triangular region and the cone shaped region to a pyramidal section to simplify the geometry calculations discussed below. The examples shown herein are represented in two dimensions for clarity.

In FIG. 1 the shape of the field of view region 7 has been modified due to the presence of the second building 3. The location of the building and the space it occupies comprises obstruction data. The method is adapted to identify locations at which the field of view region contacts an obstruction. The field of view region can then be modified to exclude areas that would be obscured by the obstruction. It can be seen that an area 8 has been removed from the field of view region 7 due to the presence of the second building 3.

Turning to consideration of trace data 4, the method will determine that data point 4c of the trace data falls with the field of view region 7. This can be achieved by comparing the coordinates that represent the geographical location 4c with the geographical coordinates that form the field of view region 7. The method also checks whether the direction of travel of the potential viewer at point 4c is substantially towards or away from the focus point. This is achieved by using geometrical calculations on the coordinates to examine whether the direction has a component that is towards the point of interest i.e. the distance of the potential viewer from the focus point is decreasing with time. The arrow 4 shows the direction of movement and it is therefore verified that the point 4c is located in the field of view and is travelling towards the focus point. This is recorded as a potential view. The length of time that the potential viewer spent within the field of view may also be recorded. In this case, the length of time may be equal to the sampling period of the trace data as one point was located in the field of view. For example, if the trace data is collected at 10 second intervals, then it will be recorded that the potential viewer was in view of the focus point for 10 seconds.

Turning to consideration of trace data 5, the method will determine that none of the points fall with the field of view 7 and this data trace will be ignored.

Turning to consideration of trace data 6, the method identifies that points 6c and 6d fall within the field of view 7 of the focus point. However, the direction of travel at point 6c and 6d is away from the focus point and therefore these points are ignored. This is advantageous, as the method takes account of the fact that the potential viewer would have their back to an advertisement located at focus point 1 and therefore would probably not see it, despite having the possibility to do so. Alternatively, the method may be adapted to record a probability of view value based on the direction of travel at the points 6c and 6d. If the potential viewer is travelling away from the focus point, the value recorded may be a percentage of value recorded for a potential view. Thus, if the direction of travel is towards the focus point the probability of view is determined to be one and the count of potential views is incremented by one. If the direction of travel is away from the focus point the probability of view value is determined to be ½ and the potential view count is incremented by ½.

Figure 2:
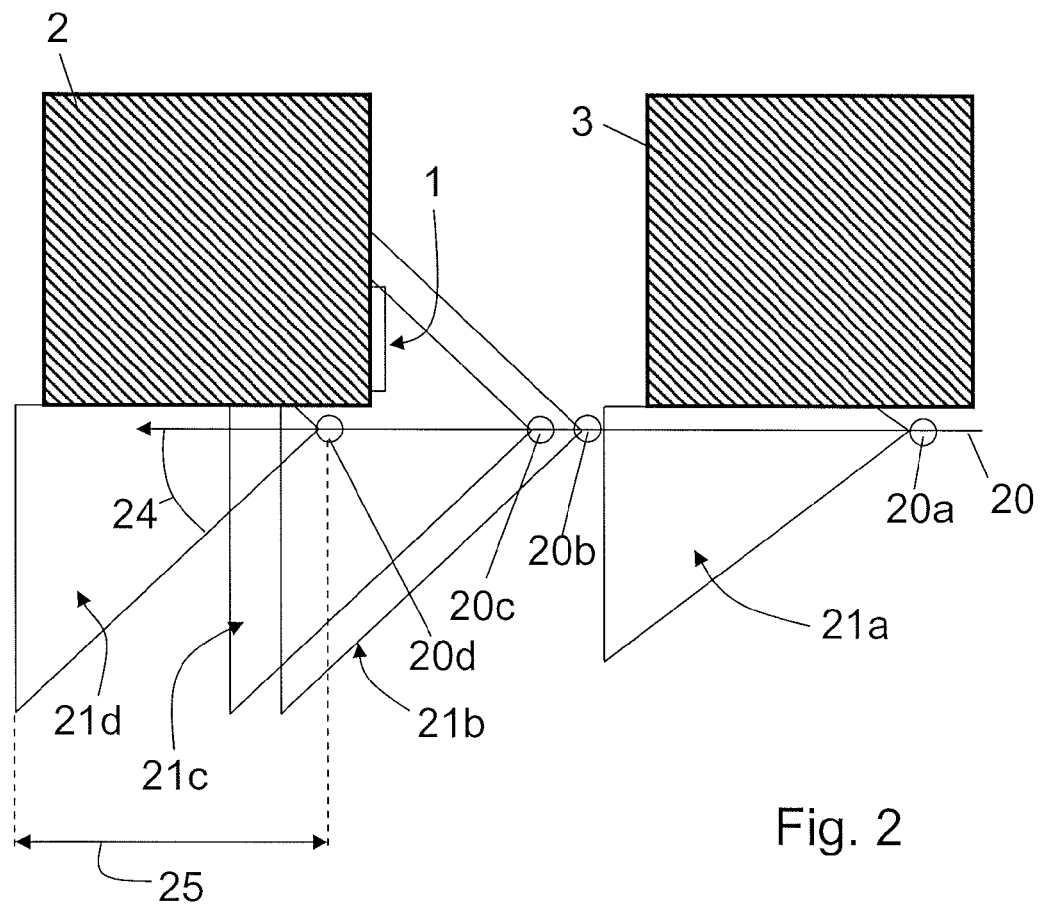
FIG. 2 shows a plan view representation of a field of view projected from each of a plurality of geographical locations defined by trace data.

FIG. 2 shows an example of when the field of view is projected from the geographical location of the potential viewer. The movement of one potential viewer is shown in FIG. 2 as trace data 20, which comprises points 20a, 20b, 20c and 20d. It can be seen from the trace data 20 that the points 20b and 20c are close together. As the location data is collected at predetermined time intervals, this indicates that the potential viewer slowed at this point, perhaps due to being held at traffic lights for instance.

As in the previous example, the method receives the location of the focus point 1 and the trace data 20 and projects a field of view from each of the location points 20a, 20b, 20c, 20d that make up the trace data. Thus, the field of view projected from point 20a comprises the triangular shaped area 21a. The field of view projected from point 20b comprises the triangular shaped area 21b. The field of view projected from point 20c comprises the triangular shaped area 21c. The field of view projected from point 20d comprises the triangular shaped area 21d. The obstruction data which represents the building 3 has caused the method to modify the shape of the field of view from point 20a. However, it will be determined that the focus point 1 does not fall with the field of view region 21a and therefore this location point is ignored. The focus point 1 will however be found to fall within the field of view 21b of point 20b and the field of view 21c of point 20c. These points will therefore be recorded for including in the audience map. The focus point 1 does not fall within the field of view 21d of point 20d and therefore this point will be ignored.

As in the previous example, the length of time that the focus point remains in the field of view of the potential viewer is recorded. In this instance, if a trace data sampling rate of 10 seconds is used, two points are determined to be equal to 20 seconds of time in which the focus point is viewable.

It will be appreciated that the length of time that a focus point is in view could be calculated more accurately if the sampling period was reduced. Accordingly the method may determine the location point which has the earliest time when the focus point is in the field of view and then the location point which has the latest time. It can then subtract the latest time from the earliest time.

In the above example, the method uses the obstruction data to modify the field of view 21a-d at every point of data trace 20. However, to reduce processing, the method may determine which points have the focus point in view when ignoring the obstruction data to obtain a subset of points. Then the method only needs to modify the field of view of the subset of points to determine if the focus point falls within the modified field of view.

Figure 3:
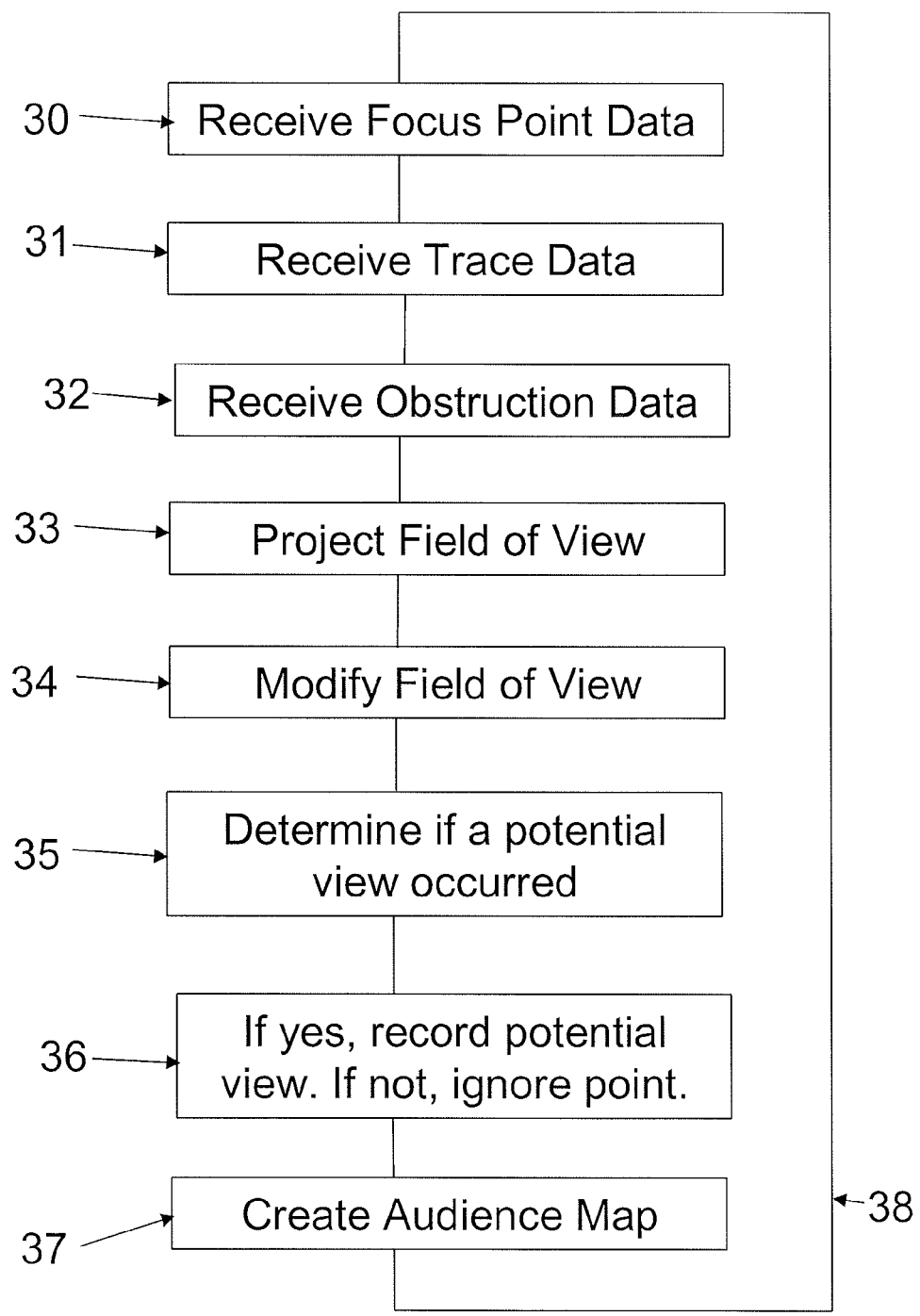
FIG. 3 shows a flow chart illustrating an embodiment of the method of creating an audience map.

FIG. 3 shows a flow chart illustrating the method steps. Step 30 shows the method receiving details of the geographical location to be considered which is termed the focus point 1. The focus point may be the present position of an advertising hoarding or it may be one of many points to be considered on the façade of a building.

Step 31 shows the method receiving the trace data, which comprises
    a plurality of sets of points that represents the movements of a potential viewer. The trace data may be filtered before being input to the method. Thus, only traces which are in the general locality of the focus point are included. Therefore, less processing is required in determining the field of view as fewer traces need to be considered Step 32 shows the method receiving obstruction data. The obstruction data may be obtained from pre-existing maps or models, or may be obtained using a range finder in the field. The obstruction data may also be filtered so that only obstructions in the locality of the focus point 1 are considered.

Step 33 shows the projection of the field of view from the focus point or each of the points of the trace data. The method may store predetermined values used to project the field of view, such as the maximum viewable range, being the maximum distance away from the focus point or potential viewer that the focus point can be seen or the potential viewer could be expected to see. The method may also store a maximum view angle, which comprises the limit of a person's peripheral vision. Therefore, the field of view may be projected at the maximum view angle 24 either side of the direction of travel and up to the maximum viewable range 25. While this embodiment uses these predetermined values to project the field of view, the size of the field of view may be related to the velocity of a potential viewer. Thus, the method may increase the maximum view angle at lower velocities and decrease it at higher velocities.

Step 34 shows the modification of the field of view using the obstruction data. The modification of the field of view may be performed by projecting view lines from the focus point to achieve an accurate representation of the field of view region in which the focus point could be seen. FIG. 1 shows this approach by projecting a line from point 9 on the edge of the focus point 1 that passes adjacent the corner 10 of the building 3 to the predetermined maximum viewable range. This line is used to exclude the area 8 from the field of view region 7. FIG. 2 shows an alternative approach to modifying the field of view that is an approximation of the technique used in FIG. 1. In FIG. 2, rather than projecting view lines to define the limits of view, the obstruction forms a limit on the field of view up to the maximum viewable range.

Step 35 shows the determination of whether or not the focus point is in the field of view of the potential viewer at a particular point or whether or not a particular location point of the potential viewer is in the field of view of the focus point. If it is determined that the relevant point falls within the field of view, it is termed a "potential view". The length of time that the "potential view" occurred for is also recorded.

Step 36 shows the recording of the potential views.

Step 37 shows the creation of an audience map based on the record of "potential views" and the length of time of the "potential views".

The method may now repeat at 38 and consider a different focus point. As more points are considered, the audience map becomes increasingly detailed.

Figure 4:
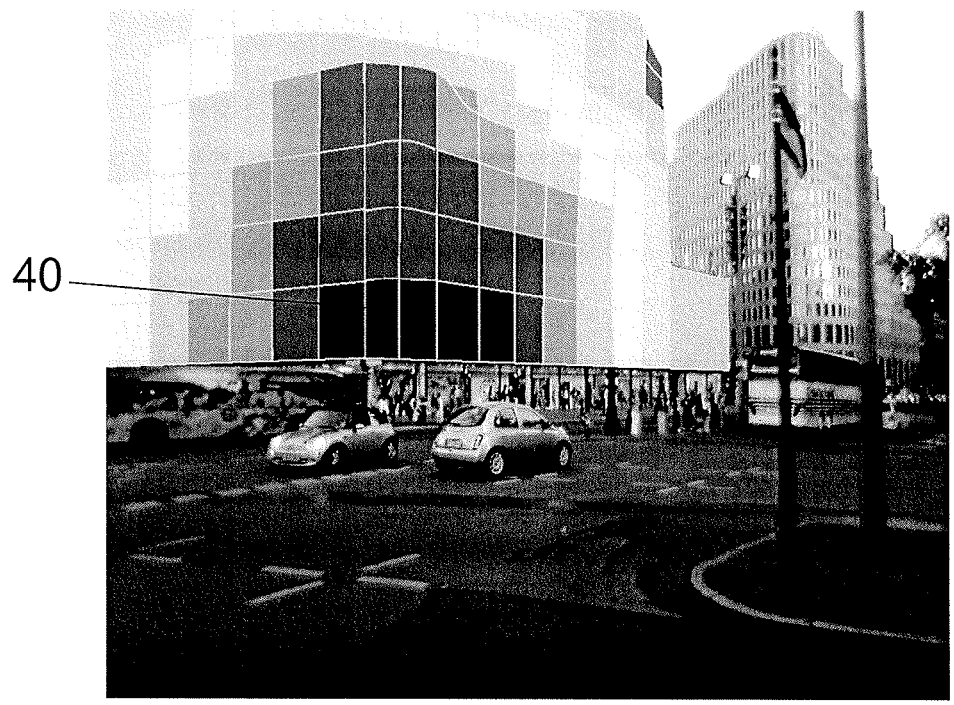
FIG. 4 shows an first example of an audience map.

FIG. 4 shows an example of an audience map for a three dimensional incarnation of the method. The façade has been broken up into a plurality of areas (different focus points) which may be coloured or numbered to show the most viewed parts of a façade. The darker squares at point 40 show the most viewed portion of the façade.

Figure 5:
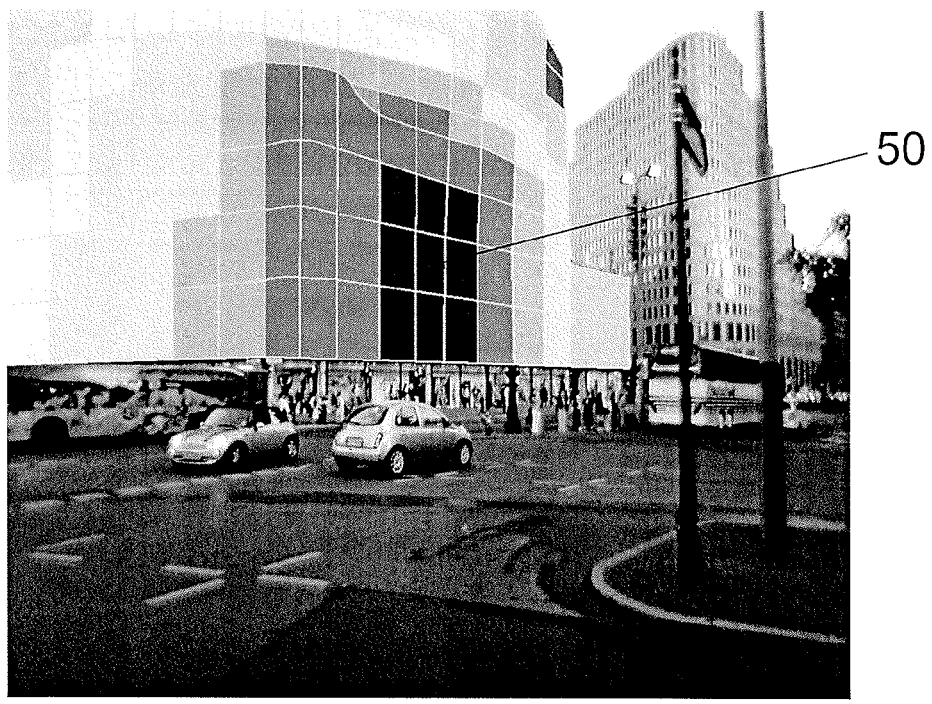
FIG. 5 shows a second example of an audience map.

FIG. 5 shows an alternative audience map which uses the length of time that a focus point is in view. In this representation, the focus points around point 50 are viewed for the longest time. As can be seen the different areas are coloured differently, showing a difference between the most prominent part of a façade and the part that is viewed for the most time.

The invention claimed is:

1. A method of creating an audience map with a processor of a computing device comprising the steps of:
    receiving a plurality of focus points comprising location data defining geographical locations;
    receiving trace data comprising at least one geographical location of a potential viewer and a record of the velocity of a potential viewer;

determining a field of view which represents a region within which the potential viewer could see, determining a maximum view angle associated with the velocity of the potential viewer, wherein the maximum view angle is increased or decreased based on the velocity of the potential viewer; and either:

(i) determining and storing within the audience map, for each focus point, the geographical locations of the trace data that have the focus point within the field of view of the potential viewer; or (ii) determining and storing within the audience map, for each of the geographical locations of the potential viewer, the focus points that fall within the field of view of the potential viewer.

2. A method according to claim 1, in which the trace data includes the direction the potential viewer is travelling for each geographical location and the step (i) further comprises determining and storing a probability that a potential user at each geographic location can see the focus point based on the direction of travel with respect to the each focus point at each geographical location.

3. A method according to claim 1, in which the at least one of the focus points comprises an area and the field of view is projected from the area.

4. A method according to claim 1 in which the trace data is captured at predetermined time intervals.

5. A method according to claim 1, in which the trace data is received from navigation devices of potential viewers, the navigation devices adapted to log at least the location and direction of the potential viewer at predetermined time intervals.

6. A method according to claim 1, in which the field of view of the potential viewer comprises an area which represents the potential viewer's field of vision and is calculated using the direction of travel of the potential viewer at each geographical location.

7. A method according to claim 1, in which the field of view comprises a volume and the trace data comprises three-dimensional geographical location information.

8. A method according to claim 1, in which the method includes the step of receiving obstruction data, which represents regions in which the field of view cannot extend and modifying the field of view so that regions within and beyond the obstructions are excluded therefrom.

9. A method according to claim 1, in which the field of view of the potential viewer at each geographical location of the trace data is determined from predetermined values.

10. A tangible computer system for performing the method defined in claim 1.

11. A non-transitory computer readable medium comprising information representative of the method defined in claim 1.

* * * * *